No. 770,700. Patented September 20, 1904.

UNITED STATES PATENT OFFICE.

MORITZ ROESELER, OF BERLIN, GERMANY, AND AUGUST SCHAER, OF HOLLAND, MICHIGAN.

PROCESS OF MAKING SUGAR FROM BEETS.

SPECIFICATION forming part of Letters Patent No. 770,700, dated September 20, 1904.

Application filed January 30, 1904. Serial No. 191,356. (No specimens.)

*To all whom it may concern:*

Be it known that we, MORITZ ROESELER, a subject of the Emperor of Germany, residing at Berlin, Germany, and AUGUST SCHAER, a citizen of the United States, residing at Holland, in the county of Ottawa and State of Michigan, have invented certain new and useful Improvements in Processes of Manufacturing Sugar from Sugar-Beets, of which the following is a specification.

This invention relates to a process for manufacturing sugar from sugar-beets, and has for its object to provide a novel restitution process by means of which the maximum amount of sugar is extracted from the beets with a minimum loss of sugar contained in beets without producing after-products.

The invention consists in the process hereinafter set forth and claimed.

The processes as heretofore commonly employed or pursued will be first briefly described, and finally the steps or mode of procedure embodying the features of the invention will be set forth in detail.

In carrying out the improved process the first molasses from the centrifugals is boiled in an open tank and allowed to stand for, say, one hour, the foam or scum on the surface being completely removed. The first molasses—that is to say, the material resulting from the primary or initial operation from which the scum has been removed—is next passed through an osmose-battery. The temperature of the first molasses and the temperature of the water and the proportion of the water to the first molasses or syrup product will be regulated in such manner that the osmosed primary product shows a coefficiency of purity of about seventy-seven. The osmosed primary product is then conveyed to a tank provided with a suitable stirring device, in which it is cooled to 20° centigrade, (about 68° Fahrenheit,) and while the molasses is being constantly stirred very dilute phosphoric acid is slowly added and the whole is mixed with a metal oxid of alkaline earth. The quantities of phosphoric acid and of metal oxid of alkaline earth are regulated proportionately from the standpoint of equivalency to the non-sugar matter contained in the osmosed molasses. The molasses thus prepared is then saturated with carbonic acid to an alkalinity of 0.07 per cent. and then with sulfurous acid to an alkalinity of 0.05 per cent. and is then uniformly mixed with the diffusion-juice from the first saturation and next passed through a filter-press. 0.25 per cent. of quicklime is then added to the juice from the filter-presses and the juice is boiled, after which said juice is saturated with carbonic acid and sulfurous acid to an alkalinity of 0.02 per cent. and passed through filter-presses while still hot, then through a filter, and from the latter into evaporating apparatus. The thick juice resulting is then saturated with sulfurous acid to an alkalinity of 0.01 per cent., is filtered through sand filters, and finally discharged into the vacuum-pans.

It is well known to those thoroughly familiar with the art to which this invention relates that heretofore it has not been practical in large factories to separate from the beet-juice those substances collectively known as "non-sugars." These non-sugars accumulate in the after-products and the molasses and retard the crystallization of the sugar contained in such inferior products. Many processes have been devised by which the sugar is partly made crystallizable, and hence obtainable from the inferior molasses by separating therefrom a part of the non-sugar substances. For example, one of these is the osmose process, in which the easily-crystallizable alkaline salts are precipitated; another in which the sugar contained in the inferior molasses is converted into saccharates of lime, of baryta, or of strontium, and the like. These saccharates are then separated from the mother-lye and saccharates neutralized by carbonic acid, sulfurous acid, and the like, converting the solution of the saccharates into sugar and into the insoluble alkaline salts. Commonly a large part of sugar which passes off with the alkalies to the osmosed water is lost, while the sugar retained and obtained has a deep dark-brown color and is of an inferior quality. The lime, baryta, strontium, and similar saccharate processes require expensive plants, and all the sugar contained in the inferior molasses cannot be gained. The non-sugar component of the beet-juice, the albumen or proteid-like substances, especially vegetable albumen, the asparagine, the betoine, the pectose, pectoine bodies in general, and also arabine and the like, arabinic acid, citric acid, oxalic acid, phosphoric acid, sulfuric acid, chlorin, and silica, as well as the salts of potassium, sodium, lime, magnesium, rubidinum, manganous oxid, and ferrous oxid, are not found free and uncombined in the beet-juice, but form very complex chemical compounds. All of these chemical compounds undergo many changes during the further treatment of beet-juice through the heat, the influence upon the degree of solubility of the beet-juice at various concentrations, and through the action of the lime and the alkaline earths and the like. The albumen is coagulated by heat as well as by acids and is again dissolved by alkalies. All the proteid substances are decomposed by lime—for instance, ammonia being formed, and a part of this ammonia in some cases again enters into combination as a base. Through the influence of alkalies asparaginic acid is formed from asparagine, while ammonia is also developed. The asparaginic acid remains combined with alkalies and passes over with them into the molasses. From the pectose pectinic acid (arabinic acid) and meto-pectinic acid are formed. Many of these chemical changes occur in the treatment of the beet-juice, so that at every stage of the manufacture of the sugar the beet-juice continually shows ever-changing and new chemical combinations of the non-sugar components. For these reasons it is very important at what stage during the manufacture of the sugar the assistant chemicals are added to the beet-juices; furthermore, in what amounts and whether in concentrated or diluted solutions, at what temperatures, and finally the duration of the influence of chemicals. The most unsuitable stage of the process during which the action of these assisting chemicals takes place is that wherein the non-sugar substances have already accumulated in considerable quantities and the percentage of pure sugar is quite low—that is, in the inferior last molasses—because at such stage the mass of non-sugar substances is too great, the percentage of sugar too small, the chemical composition of the non-sugar substances is very hard to disintegrate, and the physical composition of the entire mass of raw substances is very unfavorable and when boiled can only be treated slowly and with difficulty. By means of the novel process embodying the features of this invention, which begins at the first saturation of the diffusion-juice and extends over the entire subsequent manufacture of beet-sugar, these disadvantages and unfavorable results are eliminated from the manufacture of the sugar, and it will now be described in detail.

The whole of the molasses from the first masse-cuite in the centrifugals is caused after preparation to flow to the beet-juice in the first saturation-tanks together with the diffusion-juice, and from thence forward the initial molasses undergoes all the subsequent treatments together with the diffusion-juices. For this purpose this product or molasses from the centrifugals is treated as follows: Said product is collected in a tank, in which it is boiled and afterward allowed to stand for about one-half hour. During this time a coat of scum collects on the mass, and after the scum is removed from the initial product or molasses the latter is filtered by a claritas filter, cloth filter, sand filter, or the like and then flows into the osmose-tanks, passes the osmose apparatus, in which the coefficiency of purity of the osmosed product or syrup rises to seventy-seven. Afterward the osmosis syrup from the osmose apparatus goes to the mixing-tanks, in which the osmosed molasses is carried down approximately to 68° Fahrenheit, and when the said temperature is reached a very diluted solution of phosphoric acid is slowly added, the stirring operation being maintained during the introduction of said acid. When this has been accomplished, a metal oxid of alkaline earth is added to the mass. The mixture is then conveyed to the saturation-tanks, where it is saturated with carbonic acid to an alkalinity of 0.07 per cent. and immediately thereafter is saturated with sulfurous acid to a percentage of 0.05 per cent. The mixture thus prepared passes the filter-presses together with the diffusion-juice after the latter has been saturated. The molasses is then mixed with the diffusion-juices and treated in common with them. To the juice of the filter-presses a small quantity of lime is added, and a second saturation, by means of carbonic acid and sulfurous acid, to an alkalinity of 0.02 per cent. is effected. The juice thus saturated is passed through a filter-press and is then conveyed away from the latter for evaporation. The thick juice from the evaporating apparatus undergoes a third saturation, by means of sulfurous acid, to an alkalinity of 0.01 per cent., is passed through a cloth filter, clarifier, or sand filter, and then into the vacuum-pan. In said vacuum-pan the thick juice is boiled until complete crystallization of the masse-cuite in one boiling occurs, and the centrifugal overflow resulting from the masse-cuite goes through the above-described process, and in this way no after-products or molasses are formed.

All the sugar going from the centrifugals is of the same value, and after the processing seasons are over there are no after-products resulting from the processes except that resulting immediately after working up the last beet and the last diffusion juice of which is saturated. This small amount of molasses is simply concentrated to crystallization and kept until the beginning of the next season.

Having thus fully described the invention, what is claimed as new is—

1. The herein-described process of manufacturing beet-root sugar, consisting in freeing the centrifugal overflow from the alkaline salts by osmosis, treating the osmosed centrifugal overflow with phosphoric acid to separate the surplus alkalies and a part of the organic non-sugars, neutralizing the surplus phosphoric acid with an oxid of an alkaline-earth metal, and precipitating the compound thus formed with carbonic and sulfurous acids.

2. The herein-described process of manufacturing beet-root sugar, consisting in freeing the centrifugal overflow from alkaline-salts by osmosis, treating the osmosed centrifugal overflow with phosphoric acid to separate the surplus alkalies and a part of the organic non-sugars, neutralizing the surplus phosphoric acid with an oxid of an alkaline earth metal, precipitating the compound thus formed with carbonic and sulfurous acids, mixing the centrifugal overflow thus treated with the purified beet-juices in a vacuum, and concentrating the mass to granulated sugar.

3. The herein-described process of manufacturing granulated sugars or large white crystallized sugar or raw sugars from beets, consisting in freeing the initial product or syrup resulting from the first masse-cuite from the alkaline salts by osmosis, treating the osmosed syrup with phosphoric acid to separate the surplus alkalies and a part of the organic non-sugars, neutralizing the surplus phosphoric acid with an oxid of alkaline-earth metal, and precipitating the latter compound thus formed with carbonic and sulfurous acids, and causing this so-prepared syrup together with the beet-juice to form in masse-cuite by one boiling.

4. The herein-described process of manufacture of white granulated sugar from beets, consisting in treating the centrifugal overflow separated from the granulated sugar from alkaline salts by osmosis, treating the osmosed centrifugal overflow with phosphoric acid to separate the alkaline matter and a part of the organic non-sugar substances, neutralizing the surplus phosphoric acid with an oxid of an alkaline-earth metal, precipitating the compounds thus formed with carbonic or sulfurous acids, and mixing the centrifugal overflow thus treated with the beet-juice, and the thick juice therefrom, to concentrate in the vacuum-pan in one boiling to granulated sugar.

In testimony whereof we have hereunto set our hands in presence of two subscribing witnesses.

MORITZ ROESELER.
AUGUST SCHAER.

Witnesses to signature of Moritz Roeseler:
WOLDEMAR HAUPT,
HENRY HASPER.

Witnesses to signature of August Schaer:
W. J. PFEIFER,
PAUL G. LEWIS.